United States Patent
Lee et al.

(10) Patent No.: US 8,873,664 B2
(45) Date of Patent: Oct. 28, 2014

(54) TRANSMISSION BEAMFORMING METHOD AND APPARATUS IN AN ORTHOGONAL FREQUENCY DIVISION MULTIPLEXING-BASED MIMO WIRELESS SYSTEM

(75) Inventors: Yong-Hwan Lee, Seoul (KR); O-Jin Kwon, Seoul (KR); Keon-Wook Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 158 days.

(21) Appl. No.: 13/520,794

(22) PCT Filed: Jan. 7, 2011

(86) PCT No.: PCT/KR2011/000114
§ 371 (c)(1),
(2), (4) Date: Jul. 6, 2012

(87) PCT Pub. No.: WO2011/084007
PCT Pub. Date: Jul. 14, 2011

(65) Prior Publication Data
US 2012/0321017 A1  Dec. 20, 2012

(30) Foreign Application Priority Data
Jan. 8, 2010  (KR) ........................ 10-2010-0001826

(51) Int. Cl.
| | | |
|---|---|---|
| *H04B 7/02* | (2006.01) | |
| *H04B 7/06* | (2006.01) | |
| *H04L 5/00* | (2006.01) | |
| *H04L 25/02* | (2006.01) | |
| *H04L 25/03* | (2006.01) | |

(52) U.S. Cl.
CPC ............ *H04B 7/0639* (2013.01); *H04B 7/0641* (2013.01); *H04L 5/0023* (2013.01); *H04L 25/0204* (2013.01); *H04L 25/022* (2013.01); *H04B 7/0663* (2013.01); *H04L 25/0224* (2013.01); *H04L 25/03949* (2013.01)
USPC ............ 375/267; 375/299; 375/347; 455/101

(58) Field of Classification Search
None
See application file for complete search history.

(56) References Cited

U.S. PATENT DOCUMENTS

| | | | |
|---|---|---|---|
| 6,728,233 B1 | 4/2004 | Park et al. | |
| 8,005,156 B2 * | 8/2011 | Hojen-Sorensen et al. | .. 375/260 |

(Continued)

FOREIGN PATENT DOCUMENTS

| | | |
|---|---|---|
| KR | 10-2006-0130806 A | 12/2006 |
| KR | 10-2007-0058355 A | 6/2007 |
| KR | 10-2009-0100153 A | 9/2009 |

OTHER PUBLICATIONS

International Search Report in International Application No. PCT/KR2011/000114, dated Sep. 8, 2011.

*Primary Examiner* — Adolf Dsouza
(74) *Attorney, Agent, or Firm* — Park, Kim & Suh, LLC

(57) ABSTRACT

The present invention relates to a transmission beamforming method and apparatus in an orthogonal frequency division multiplexing (OFDM)-based MIMO wireless system. In particular, the present invention relates to a transmission beamforming method in an OFDM-based MIMO wireless system and an apparatus therefor, wherein the transmission beamforming method comprises: estimating a channel from a received pilot signal and obtaining time for the estimating channel and 2D channel correlation information of a frequency band; obtaining estimated channel information based on the channel correlation information; obtaining differential information that represents a difference between the current channel and the estimated channel and quantizing the differential information; and generating a transmission beam weight by using a predefined code book from the quantized differential information. The present invention may also provide a method and apparatus for reducing the channel quantization error and feedback load by employing the OFDM-based MIMO in a wireless communication system using a transmission beamforming scheme, wherein a receiver estimates current channel information by using time and 2D channel correlation information of a frequency based on the previous channel information, compares the estimated current channel information with an actual channel and then feeds back the differential channel information, i.e., the difference between the estimated channel and the actual channel, to a transmitter.

22 Claims, 8 Drawing Sheets

(56) References Cited

U.S. PATENT DOCUMENTS

| | | | |
|---|---|---|---|
| 8,249,509 B2 * | 8/2012 | Wang et al. ............... 455/62 |
| 8,553,799 B2 * | 10/2013 | Wang et al. ............... 375/267 |
| 2006/0279460 A1 * | 12/2006 | Yun et al. ............... 342/377 |
| 2007/0129111 A1 | 6/2007 | Kim et al. |
| 2007/0147533 A1 * | 6/2007 | Thomas et al. ............... 375/267 |
| 2007/0195974 A1 * | 8/2007 | Li et al. ............... 381/94.3 |
| 2007/0206626 A1 * | 9/2007 | Lee et al. ............... 370/437 |
| 2009/0042530 A1 * | 2/2009 | Wang et al. ............... 455/334 |
| 2009/0298424 A1 * | 12/2009 | Liu et al. ............... 455/39 |
| 2010/0054114 A1 * | 3/2010 | Li et al. ............... 370/203 |
| 2010/0087151 A1 * | 4/2010 | Auer ............... 455/67.11 |
| 2010/0172256 A1 * | 7/2010 | Mallik et al. ............... 370/252 |
| 2011/0058506 A1 * | 3/2011 | Lee et al. ............... 370/280 |
| 2012/0014424 A1 * | 1/2012 | Heath et al. ............... 375/224 |
| 2012/0045003 A1 * | 2/2012 | Li et al. ............... 375/260 |
| 2012/0147985 A1 * | 6/2012 | Li et al. ............... 375/285 |
| 2012/0188900 A1 * | 7/2012 | Li et al. ............... 370/252 |
| 2012/0281776 A1 * | 11/2012 | Khojastepour ............... 375/260 |
| 2013/0100898 A1 * | 4/2013 | Zhu et al. ............... 370/329 |

* cited by examiner

TRANSMISSION BEAMFORMING METHOD AND APPARATUS IN AN ORTHOGONAL FREQUENCY DIVISION MULTIPLEXING-BASED MIMO WIRELESS SYSTEM

TECHNICAL FIELD

The present invention relates to a method and apparatus for transmission beamforming in an Orthogonal Frequency Division Multiplexing (OFDM) based multi-antenna wireless system, and more particularly, to a method and apparatus for quantizing channel information based on channel correlation information, transmitting the quantized channel information to a transmitter, and generating a transmission beam based on the channel information in a multi-antenna OFDM system.

BACKGROUND ART

An OFDM modulation scheme can virtually convert frequency selective channel environments into multiple frequency non-selective channel environments, allowing the use of a multi-antenna technique without complicated equalization. Signal transmission using a multi-antenna scheme can improve the reliability in data transmission by achieving beamforming gain as well as diversity gain in fading environments.

It may be desirable for the base station (BS) to generate a beam weight based on channel information in order to maximize the performance of an OFDM based beamforming system. The BS generally use the channel information estimated by the mobile station (MS) because it cannot estimate the channel information of the MS in a Frequency Division Duplexing (FDD) environment.

As a consequence, a number of research works have been conducted on the feedback of channel information estimated by the MS to the BS, where the channel information is quantized using a codebook predefined in the BS and MS. Such a codebook-based channel information feedback scheme refers to a scheme for finding the best channel information from a codebook and reporting the index of the best channel information to the BS. Especially, a Grassmannian codebook scheme can efficiently generate a codebook with the use of less information by exploiting that the beam weight is generated indifferently from the phase. However, if the number of quantization bits (or bit size) used for the codebook is small, the quantization error increases, decreasing the beamforming gain. Since the channel information required for the beamforming increases in proportion to the number of subcarriers and symbols in an OFDM system, the signaling overhead for the feedback of channel information significantly increases.

To alleviate such shortcomings, a scheme for reducing the amount of channel information for the feedback by exploiting the correlation between contiguous symbols or subcarriers of OFDM has recently been proposed. The channel may have high correlation with adjacent channels in the presence of correlation between the sub-channels. Thus, the signaling overhead for the feedback of channel information can be reduced by re-defining adjacent symbols or subcarriers using a sub-codebook which has a smaller size than the original codebook. However, the quantization error induced by the original codebook cannot be reduced. Moreover, the improvement of the channel estimation accuracy is limited by using the channel correlation information in the time or frequency domain.

DETAILED DESCRIPTION OF THE INVENTION

Technical Problems

The present invention alleviates the aforementioned problems of the prior art. Although it is important for a transmitter to generate a beam weight using channel information in order to maximize the performance of OFDM based beamforming transmission, a receiver needs to estimate channel information and feedback it to the transmitter because the transmitter is unable to estimate the channel information of the receiver in an FDD environment. For the feedback, the channel information is quantized using a codebook and the present invention alleviates the problem of overall system performance deterioration associated with the channel quantization error and the signaling overhead for the feedback of channel information to the transmitter from the receiver.

To reduce the channel quantization error and the feedback signaling overhead, the present invention proposes a method and apparatus in which a receiver estimates current channel information from the previous channel information by exploiting the channel correlation information in the two-dimension (i.e., time and frequency domain), and reports only the difference between the current and previous channel information to a transmitter, thereby decreasing the amount of feedback signaling overhead for achieving the same performance or the quantization error using the same size codebook.

Further, the present invention proposes a method and apparatus capable of decreasing the channel quantization error and decreasing the feedback signaling overhead as well, wherein the receiver reports the magnitude of instantaneous difference vector in the feedback of differential channel information, making the transmitter get more accurate channel information. This allows the transmitter to generate a beam weight with reduced quantization error.

Technical Solutions

To achieve the above technical object, the present invention includes a transmission beamforming method in an Orthogonal Frequency Division Multiplexing (OFDM) based wireless system using multi-antennas, including A) the channel estimation from received pilot signal and the calculation of channel correlation in the time and frequency domain; B) the estimation of channel information by exploiting the channel correlation; C) the quantization of the difference between the current and estimated channel information; D) the selection of the index of the predefined codebook corresponding to the quantization of differential channel information; and E) the generation of transmission beam weight from the codebook index.

In an embodiment of a first method of the present invention, step B) may include the calculation of estimated beam weight for the current channel from the previous beam weight by exploiting the two-dimensional channel correlation, step C) may include the quantization of the beam weight difference between the current and the estimated channel, step D) may include the optimum selection of the codebook index in a predefined codebook from the quantized beam weight difference vector and the feedback of averaged beam weight difference vector.

The estimated beam weight of step B) may be calculated by the following [Equation 4]:

$$\hat{w}(k,t) = \frac{\rho_{\Delta t}(1-|\rho_{\Delta f}|^2)}{1-|\rho_{\Delta t}|^2|\rho_{\Delta f}|^2} \frac{\|h^*(k,t-\Delta t)\|}{\|h^*(k,t)\|} \frac{h^*(k,t-\Delta t)}{\|h^*(k,t-\Delta t)\|} + \quad \text{[Equation 4]}$$

$$\frac{\rho_{\Delta f}(1-|\rho_{\Delta t}|^2)}{1-|\rho_{\Delta t}|^2|\rho_{\Delta f}|^2} \frac{\|h^*(k-\Delta k,t)\|}{\|h(k,t)\|} \frac{h^*(k-\Delta k,t)}{\|h^*(k-\Delta k,t)\|}$$

$$\stackrel{\Delta}{=} \alpha \frac{\|h^*(k,t-\Delta t)\|}{\|h^*(k,t)\|} w(k,t-\Delta t) + \beta \frac{\|h^*(k-\Delta k,t)\|}{\|h^*(k,t)\|}$$

$$w(k-\Delta k, t)$$

$$\simeq \alpha w(k, t-\Delta t) + \beta w(k-\Delta k, t),$$

where $$\alpha = \frac{\rho_{\Delta t}(1-|\rho_{\Delta f}|^2)}{1-|\rho_{\Delta t}|^2|\rho_{\Delta f}|^2} \text{ and } \beta = \frac{\rho_{\Delta f}(1-|\rho_{\Delta t}|^2)}{1-|\rho_{\Delta t}|^2|\rho_{\Delta f}|^2},$$

which have channel correlation in the time and frequency domain, h(k,t) denotes the ($1 \times N_t$)-dimensional channel vector whose elements are independent and identically distributed (i.i.d.) zero-mean complex Gaussian random variables with unit variance, $h(k, t-\Delta t)$ and $h(k-\Delta k, t)$ respectively denote the previous channel information in time and frequency domain, $w(k, t-\Delta t)$ and $w(k-\Delta k, t)$ respectively are unit-norm ($N_t \times 1$)-dimensional vectors denoting the previous beam weight in the time and frequency domain, given by $$w(k, t-\Delta t) = \frac{h^*(k, t-\Delta t)}{\|h^*(k, t-\Delta t)\|} \text{ and}$$

$$w(k-\Delta k, t) = \frac{h^*(k-\Delta k, t)}{\|h^*(k-\Delta k, t)\|}, \text{ and}$$

$$\frac{\|h^*(k, t-\Delta t)\|}{\|h^*(k,t)\|} \approx \frac{\|h^*(k-\Delta k, t)\|}{\|h^*(k,t)\|} \approx 1$$

in correlated channel environments to which a difference feedback scheme is applied, the superscript * denotes complex conjugate operator, $\|\cdot\|$ denotes the vector norm operator, and $\rho_{\Delta t}$ and $\rho_{\Delta f}$ respectively denote the correlation coefficient in the time and frequency domain. The difference vector of step C) may be calculated by the following [Equation 5]:

$$w(k,t) - \hat{w}(k,t) = \sqrt{1 - \frac{|\rho_{\Delta t}|^2 + |\rho_{\Delta f}|^2 - 2|\rho_{\Delta t}|^2|\rho_{\Delta f}|^2}{1-|\rho_{\Delta t}|^2|\rho_{\Delta f}|^2}} \quad \text{[Equation 5]}$$

$$\hat{z}(k,t)$$

$$\stackrel{\Delta}{=} \gamma \hat{z}(k,t),$$

where $$\gamma = \sqrt{1 - \frac{|\rho_{\Delta t}|^2 + |\rho_{\Delta f}|^2 - 2|\rho_{\Delta t}|^2|\rho_{\Delta f}|^2}{1-|\rho_{\Delta t}|^2|\rho_{\Delta f}|^2}},$$

indicating the channel correlation in time and frequency domain, w(k,t) denotes the ($N_t \times 1$)-dimensional beam weight vector of current channel with unit norm, $\hat{w}(k,t)$ denotes the beam weight for the current channel estimated by [Equation 4], and $\hat{z}(k,t)$ denotes an ($N_t \times 1$)-dimensional vector with unit norm.

The optimum index of step D) may be determined by the following [Equation 7]:

$$\hat{i} = \arg\max_{1 \le i \le 2^B} |h(k,t) \tilde{w}(k,t)|, \quad \text{[Equation 7]}$$

where $\tilde{w}(k,t)$ denotes the quantized beam weight obtained by quantizing the difference vector $\hat{z}(k,t)$ using a pre-defined B-bit codebook and $\hat{i}$ denotes the optimum index for the difference vector, and the receiver may report the optimum index $\hat{i}$ of the difference vector to the transmitter.

Step E) may include the extraction of the codebook index from the channel correlation information and the difference vector reported from a receiver, and the generation of current beam weight using the channel correlation information, the codebook index and the previous beam weight.

The current beam weight in step E) may be calculated by the following [Equation 8]:

$$\tilde{w}(k,t) = \frac{\alpha \tilde{w}(k, t-\Delta t) + \beta \tilde{w}(k-\Delta k, t) + \gamma \hat{z}_i}{\|\alpha \tilde{w}(k, t-\Delta t) + \beta \tilde{w}(k-\Delta k, t) + \gamma \hat{z}_i\|}, \quad \text{[Equation 8]}$$

where $\tilde{w}(k, t-\Delta t)$ and $\tilde{w}(k-\Delta k, t)$ denote the previous beam weight, and $\tilde{w}(k,t)$ denotes the current beam weight to be used for signal transmission.

In an embodiment of the second method of the present invention, step B) may include the estimation of current channel from the two-dimensional channel correlation information, step C) may include the calculation of the channel difference vector between the current and the estimated channel, and the quantization of the channel difference vector and the magnitude of the channel difference vector, step D) may include the optimum selection of the index in a predefined codebook for the quantization of the channel difference vector and the feedback of instantaneous channel difference vector using the quantized channel information.

The channel estimation of step B) may be processed by the following [Equation 9]:

$$\hat{h}(k,t) = \frac{\rho_{\Delta t}(1-|\rho_{\Delta f}|^2)}{1-|\rho_{\Delta t}|^2|\rho_{\Delta f}|^2} h(k, t-\Delta t) + \quad \text{[Equation 9]}$$

$$\frac{\rho_{\Delta f}(1-|\rho_{\Delta t}|^2)}{1-|\rho_{\Delta t}|^2|\rho_{\Delta f}|^2} h(k-\Delta k, t)$$

$$\stackrel{\Delta}{=} \alpha h(k, t-\Delta t) + \beta h(k-\Delta k, t),$$

where $h(k, t-\Delta t)$ and $h(k-\Delta k, t)$ respectively denote the previous channel in the time and frequency domain, and $\hat{h}(k,t)$ denotes the estimated channel. The channel difference vector of step C) may be calculated by the following [Equation 10]:

$$h(k,t) - \hat{h}(k,t) = \sqrt{1 - \frac{|\rho_{\Delta t}|^2 + |\rho_{\Delta f}|^2 - 2|\rho_{\Delta t}|^2|\rho_{\Delta f}|^2}{1-|\rho_{\Delta t}|^2|\rho_{\Delta f}|^2}} z(k,t) \quad \text{[Equation 10]}$$

$$\stackrel{\Delta}{=} \gamma \|z(k,t)\| \hat{z}(k,t),$$

where $\hat{h}(k,t)$ denotes the current channel estimated from the previous channel derived by [Equation 9], h(k,t) and z(k,t) are ($N_t \times 1$)-dimensional vectors whose elements are zero-mean i.i.d. complex Gaussian random variables with unit variance, $\hat{z}(k,t)$ denotes the normalized $z(k,t)$, and the magnitude of the channel difference vector is determined by the current channel and instantaneous magnitude $\|z(k,t)\|$ of estimated channel. The codebook index of step D) may optimally be selected by the following [Equation 12]:

$$\hat{i} = \arg\max_{1 \le i \le 2^B} \left| h(k,t) \left( \frac{\alpha \tilde{h}(k, t-\Delta t) + \beta \tilde{h}(k-\Delta k, t) + \|z(k,t)\|\hat{z}_i}{\|\alpha \tilde{h}(k, t-\Delta t) + \beta \tilde{h}(k-\Delta k, t) + \|z(k,t)\|\hat{z}_i\|} \right) \right|, \quad \text{[Equation 12]}$$

where $\hat{i}$ denotes the optimum index of the channel difference vector, which may be reported to the transmitter by the receiver.

Step E) may include the extraction of the channel correlation, the codebook index, and the magnitude of the quantized channel difference vector reported from the receiver; the estimation of quantized channel information from the extracted channel correlation information, codebook index, and magnitude of the quantized channel difference vector, and the previous beam weight; and the generation of beam weight for the signal transmission using the quantized channel information.

The quantized channel information of step E) may be calculated by the following [Equation 13]:

$$\tilde{h}(k,t) = \alpha \tilde{h}(k,t-\Delta t) + \beta \tilde{h}(k-\Delta k, t) + \gamma \|z(k,t)\|\hat{z}_j, \quad \text{[Equation 13]}$$

where $\tilde{h}(k,t)$ denotes the quantized channel information. The beam weight $w(k,t)$ for the signal transmission may be calculated by the following [Equation 14]:

$$w(k,t) = \frac{\tilde{h}^*(k,t)}{\|\tilde{h}(k,t)\|}, \quad \text{[Equation 14]}$$

where $\tilde{h}(k,t)$ denotes the quantized channel information.

The present invention includes a transmit beamforming apparatus in an OFDM based multi-antenna wireless system, including a channel information estimator for the estimation of channel using received pilot signal and the calculation of two-dimensional channel correlation information in the time and frequency domain; a quantizer for the quantization of channel difference between the current and the estimated channel; and a transmit beam generator for calculating the beam weight for the signal transmission using the quantized channel difference information.

An embodiment of the first apparatus of the present invention may further include a beam weight storage for the storage of beam weight corresponding to previous channel, the channel estimator may include a channel correlation calculator for the estimation of channel from the received pilot signal and the calculation of two-dimensional channel correlation in the time and frequency domain from the estimated channel, and a beam weight generator for the calculation of beam weight for current channel using the beam weight for the previous channel stored in the beam weight storage and the channel correlation, and the quantizer may include a difference vector generator calculating the difference between the current and the estimated beam weight and a quantizer for quantizing the difference vector and selecting an index for the quantized difference vector using a predefined codebook.

The transmit beam generator may include a feedback information extractor for extracting the channel correlation and the codebook index for the difference vector; and a beam weight generator for generating transmit beam weight using the channel correlation, the codebook index, and the beam weight of previous channel.

An embodiment of the second apparatus of the present invention may further include a previous channel storage for storing the quantized previous channel information, the channel estimator may include a channel correlation information generator for channel estimation from the received pilot signal and calculation of two-dimensional channel correlation in the time and frequency domain using the estimated channel, and a current channel estimator for the estimation of current channel information using the channel correlation, and the quantizer may include a difference vector generator and quantizer for calculating and quantizing the difference between the current and the estimated channel, and selecting an index of the quantized difference vector from a predefined codebook.

The transmission beam generator may include a feedback information extractor for extracting the channel correlation, the magnitude of the difference vector, and the index of the difference vector; a channel information generator for restoring the current channel information using the channel correlation, the codebook index, and the quantized previous channel information; and a beam weight generator for generating the transmission beam weight using the estimated channel information.

Advantageous Effects

According to the present invention, in order to reduce the channel quantization error and the feedback signaling overhead in an OFDM based MIMO wireless communication system using transmission beamforming, a method and apparatus may be provided through which the receiver estimates current channel information using the two-dimensional channel correlation information in the time and frequency domain, and previous channel information, compares the estimated channel information with the actual one, and reports the difference between the two to the transmitter, thereby reducing the feedback signaling overhead or the quantization error associated with the use of a codebook.

Further, according to the present invention, a method and apparatus can be proposed, which are capable of decreasing the channel quantization error and the feedback signaling overhead, wherein the receiver reports the magnitude of instantaneous channel difference vector to the transmitter, allowing the transmitter to obtain more accurate channel information. Thus, the transmitter can generate a beam weight with reduced quantization error, thereby improving beamforming performance in OFDM based MIMO environments.

BEST MODE FOR CARRYING OUT THE INVENTION

The present invention relates to a method and apparatus for quantizing channel information based on the channel correlation, reporting the quantized channel information to the transmitter, and generating transmit beam using the quantized channel information in a MIMO OFDM system.

Hereinafter, a description will be given on the assumption of a Multiple-Input Single-Output (MISO) OFDM based wireless communication system consisting of $N_t$ transmit antennas and one receive antenna. The MISO OFDM scheme may easily be applied through extension thereof to a MIMO OFDM structure using multiple transmit antennas and multiple receive antennas. Let s(k,t) be a signal assigned to the t-th OFDM symbol and the k-th subcarrier in the above wireless communication system. Assuming that the signal is transmitted through $N_t$ transmit antennas after being beamformed using an $(N_t \times 1)$-dimensional beam weight vector w(k,t) in a wireless communication system, the received signal can be represented by the following [Equation 1]:

$$r(k,t) = h(k,t)w(k,t)s(k,t) + n(k,t) \quad \text{[Equation 1]}$$

where h(k,t) represents the $(1 \times N_t)$-dimensional channel vector whose elements are zero-mean i.i.d. complex Gaussian random variables with unit variance, and n(k,t) represents Additive White Gaussian Noise (AWGN) with variance $N_o$.

In this case, the time correlation coefficient $\rho_{\Delta t}$ can be represented by the following [Equation 2]:

$$\rho_{\Delta t} = \frac{E[h(k,t)h^*(k, t-\Delta t)]}{\sqrt{E[\|h(k,t)\|^2] E[\|h(k, t-\Delta t)\|^2]}} \quad \text{[Equation 2]}$$

In addition, the frequency correlation coefficient $\rho_{\Delta f}$ can be represented by the following [Equation 3]:

$$\rho_{\Delta f} = \frac{E[h(k,t)h^*(k-\Delta k, t)]}{\sqrt{E[\|h(k,t)\|^2] E[\|h(k-\Delta k, t)\|^2]}} \quad \text{[Equation 3]}$$

where $\Delta t$ and $\Delta k$ respectively denote the symbol spacing in the time domain and the subcarrier spacing in the frequency domain, E[·] denotes the expectation operator, the superscript * denotes complex conjugate operator, and $\|\cdot\|$ denotes the vector norm operator. Since the channel correlation coefficient $\rho_{\Delta t}$ and $\rho_{\Delta f}$ do not vary fast in time, the feedback signaling overhead for the reporting of $\rho_{\Delta t}$ and $\rho_{\Delta f}$ is very small.

Figure 1:
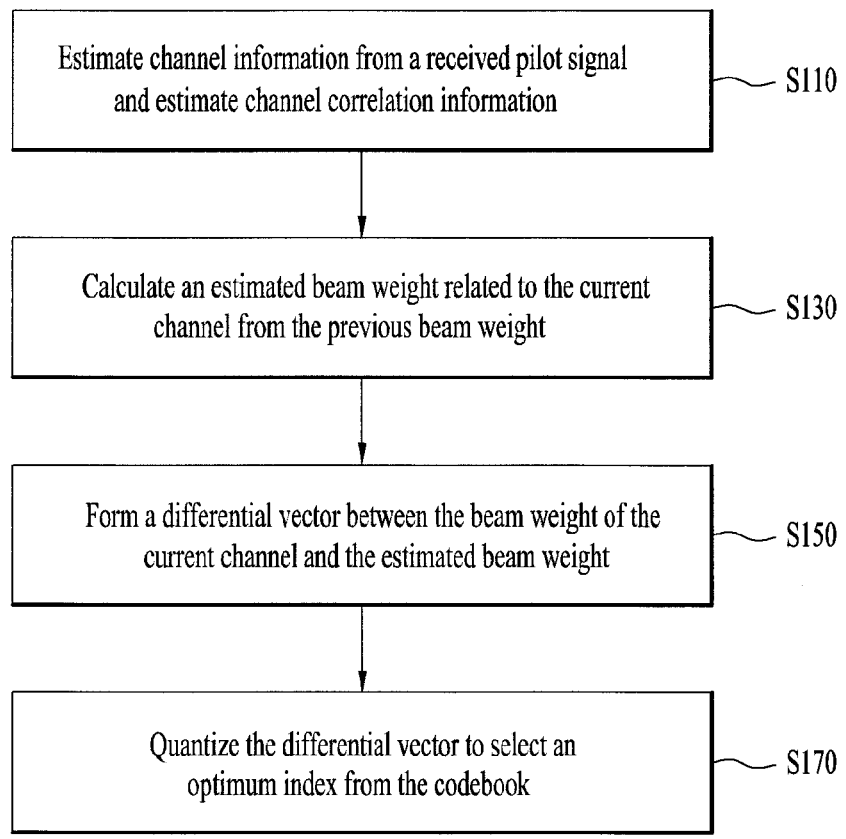
FIG. 1 is a flowchart illustrating a method for generating a beam weight using a difference vector based on two-dimensional difference channel information according to an embodiment of the present invention.

Under the assumption of a MISO OFDM based wireless communication system consisting of $N_t$ transmit antennas and one receive antenna, FIG. 1 is a flowchart illustrating a method for generating the beam weight for the current channel, extracting a codebook index by quantizing the difference vector between the beam weight for the current and the previous channel, and reporting the codebook index to the transmitter using a two-dimensional difference channel model in a wireless communication system with transmit beamforming according to an embodiment of the present invention.

The receiver estimates the channel using received pilot signal and calculates the channel correlation in the time and frequency domain using the estimated channel information as represented by [Equation 2] and [Equation 3] (S110). The receiver then estimates the beam weight ŵ(k,t) for the current channel using the previous beam weight and the calculated channel correlation information (S130), by the following [Equation 4]:

$$\tilde{w}(k,t) = \frac{\rho_{\Delta t}(1-|\rho_{\Delta f}|^2)}{1-|\rho_{\Delta t}|^2|\rho_{\Delta f}|^2} \frac{\|h^*(k, t-\Delta t)\|}{\|h^*(k,t)\|} \frac{h^*(k, t-\Delta t)}{\|h^*(k, t-\Delta t)\|} + \frac{\rho_{\Delta f}(1-|\rho_{\Delta t}|^2)}{1-|\rho_{\Delta t}|^2|\rho_{\Delta f}|^2} \frac{\|h^*(k-\Delta k, t)\|}{\|h(k,t)\|} \frac{h^*(k-\Delta k, t)}{\|h^*(k-\Delta k, t)\|}$$

$$\stackrel{\Delta}{=} \alpha \frac{\|h^*(k, t-\Delta t)\|}{\|h^*(k,t)\|} w(k, t-\Delta t) + \beta \frac{\|h^*(k-\Delta k, t)\|}{\|h^*(k,t)\|} w(k-\Delta k, t)$$

$$\simeq \alpha w(k, t-\Delta t) + \beta w(k-\Delta k, t)$$

[Equation 4]

where $$w(k, t-\Delta t) = \frac{h^*(k, t-\Delta t)}{\|h^*(k, t-\Delta t)\|} \text{ and } w(k-\Delta k, t) = \frac{h^*(k-\Delta k, t)}{\|h^*(k-\Delta k, t)\|}$$

respectively denote the $(N_t \times 1)$-dimensional previous beam weight vectors with unit norm in the time and frequency domain. It can be seen $$\frac{\|h^*(k, t-\Delta t)\|}{\|h^*(k,t)\|} \approx \frac{\|h^*(k-\Delta k, t)\|}{\|h^*(k,t)\|} \approx 1$$

in a correlated channel environment.

Next, a difference vector between the beam weight of current channel and that of the estimated channel is calculated (S150). A difference vector ẑ(k,t) indicating the difference between the beam weight of the current channel and the beam weight ŵ(k,t) estimated by [Equation 4] is generated by [Equation 5]:

$$w(k,t) - \hat{w}(k,t) = \sqrt{1 - \frac{|\rho_{\Delta t}|^2 + |\rho_{\Delta f}|^2 - 2|\rho_{\Delta t}|^2|\rho_{\Delta f}|^2}{1-|\rho_{\Delta t}|^2|\rho_{\Delta f}|^2}} \hat{z}(k,t) \quad \text{[Equation 5]}$$

$$\stackrel{\Delta}{=} \gamma \hat{z}(k,t),$$

where w(k,t) and $\hat{z}$(k,t) respectively are ($N_t \times 1$)-dimensional vectors with unit norm. Thus, it is possible to represent w(k,t) in terms of beamforming vector w(k,t−Δt) of the previous symbol, beamforming vector w(k−Δk,t) of the previous subcarrier, channel correlation coefficient $\rho_{\Delta t}$ and $\rho_{\Delta f}$, and difference vector $\hat{z}$(k,t).

Then, the difference vector is quantized by a codebook index selected from a given codebook (S170). The difference vector $\hat{z}$(k,t) derived from [Equation 5] is quantized using a codebook of B-bit size, predefined by the transmitter and the receiver, generating a quantized current beam weight as [Equation 6]:

$$\tilde{w}(k,t) = \frac{\alpha \tilde{w}(k, t-\Delta t) + \beta \tilde{w}(k-\Delta k, t) + \gamma \hat{z}_i}{\|\alpha \tilde{w}(k, t-\Delta t) + \beta \tilde{w}(k-\Delta k, t) + \gamma \hat{z}_i\|}, \quad [\text{Equation 6}]$$

where $\hat{z}_i$ denotes the difference vector quantized using the B-bit codebook and the subscript i denotes the codebook index for the quantization of the difference vector and determined by the following [Equation 7]:

$$\hat{i} = \arg\max_{1 \leq i \leq 2^B} |h(k,t)\tilde{w}(k,t)|, \quad [\text{Equation 7}]$$

Next, the receiver reports the optimum index $\hat{i}$ for the difference vector to the transmitter.

Figure 2:
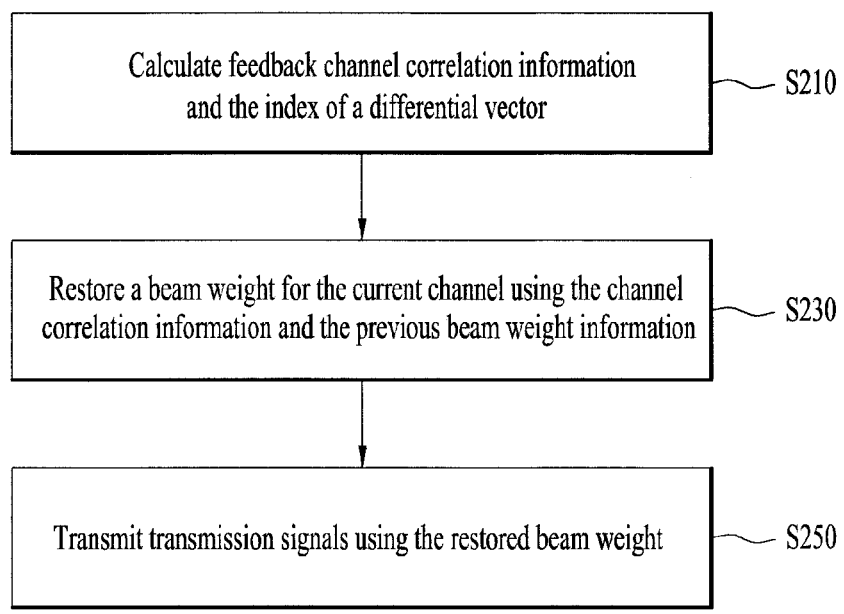
FIG. 2 is a flowchart illustrating a method for generating a beam weight using feedback channel information according to an embodiment of the present invention.

FIG. 2 is a flowchart illustrating a method for the transmitter to generate a beam weight using the two-dimensional difference channel information reported from a receiver in a wireless communication system with transmit beamforming according to an embodiment of the present invention.

The transmitter extracts the channel correlation information reported from the receiver at a long period and the codebook index $\hat{i}$ (i.e., the index of the difference vector) instantaneously reported from the receiver (S210).

The transmitter calculates the beam weight of the current channel using the previous beam weight stored in the transmitter (S230) and uses it to generates transmit signal (S250).

The process for calculating the beam weight of the current channel using the feedback information will be described in more detail. The beam weight is generated by [Equation 8] using the channel correlation coefficient $\rho_{\Delta t}$ and $\rho_{\Delta f}$ reported at a long period, the previous beam weight $\tilde{w}$(k,t−Δt) and $\tilde{w}$(k−Δk,t) stored in the transmitter, and the codebook index $\hat{i}$ for the difference vector reported from the receiver:

$$\tilde{w}(k,t) = \frac{\alpha \tilde{w}(k, t-\Delta t) + \beta \tilde{w}(k-\Delta k, t) + \gamma \hat{z}_i}{\|\alpha \tilde{w}(k, t-\Delta t) + \beta \tilde{w}(k-\Delta k, t) + \gamma \hat{z}_i\|}, \quad [\text{Equation 8}]$$

where $\tilde{w}$(k,t−Δt) and $\tilde{w}$(k−Δk,t) denote the previous beam weight and $\tilde{w}$(k,t) denotes the transmission beam weight.

MODE FOR INVENTION

The preferred embodiments of the present invention will now be illustrated to describe advantages of the present invention and operation of the present invention and objects achieved by the embodiments of the present invention.

The terminology used herein is merely used to describe specific embodiments of the present invention, but is not intended to limit the present invention. The singular forms include plural referents unless the context clearly dictates otherwise. In the present application, it should be appreciated that the term "include(s)" or "have(has)" is intended to specify the presence of stated features, numerals, steps, actions, elements, components, or combinations thereof, but they do not preclude the presence or addition of one or more other features, numerals, steps, actions, elements, components, or combinations thereof.

In describing the present invention, detailed description of known functions and configurations incorporated herein will be omitted in order not to obscure the subject matter of the present invention.

The following embodiments of the present invention relate to a method and apparatus for transmit beamforming in an OFDM system using multiple antennas, in which a receiver estimates current channel information using two-dimensional channel correlation in the time and frequency domain, and the previous channel information, and it reports only the difference channel information, corresponding to the difference between the estimated channel information and actual channel information, to a transmitter, thereby reducing the amount of feedback information or quantization error using the same bit-size codebook.

Further, the following embodiments of the present invention relate to a method and apparatus for generating a beam weight having a low quantization error by causing the receiver to feed back the instantaneous magnitude of a difference vector during feedback of difference information so that the transmitter obtains more accurate channel information.

Before describing the present invention through the embodiments thereof, reference will now be made to the embodiments shown in FIGS. 1 and 2 because the embodiments of the present invention which will be described hereinbelow are extended from the description of the best mode for carrying out the invention. In addition, repetitive parts of description will be omitted to effectively explain the present invention.

Figure 3:
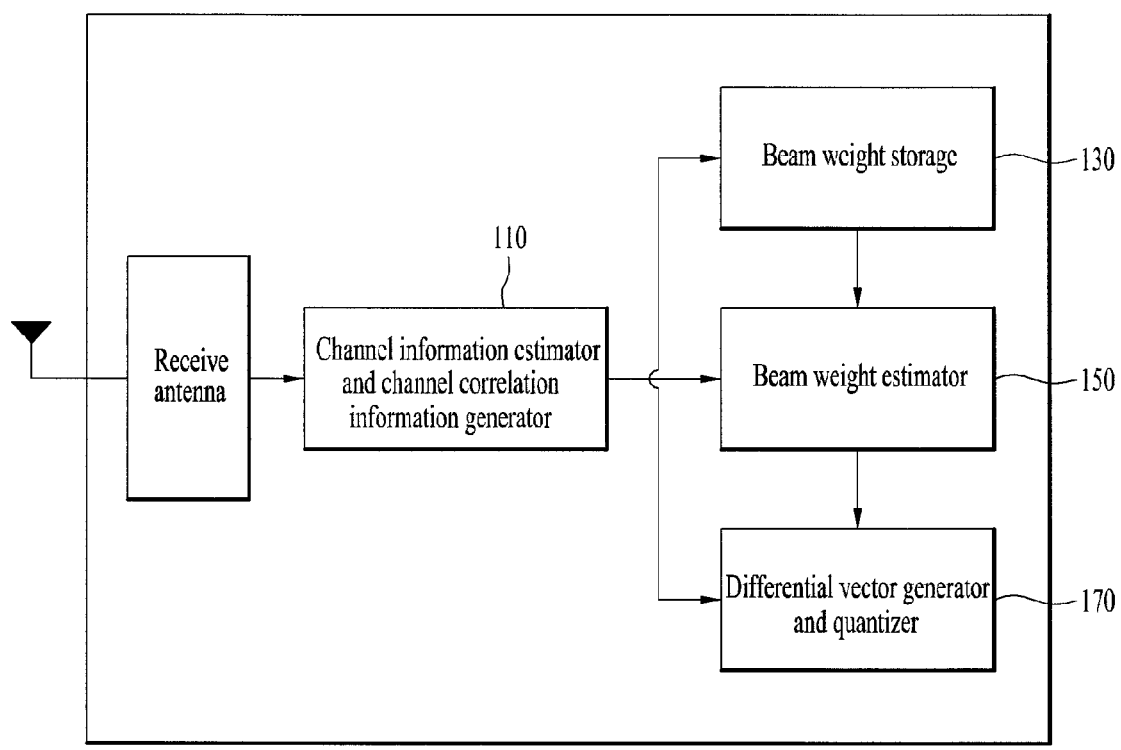
FIG. 3 is a diagram illustrating the configuration of an apparatus for generating a beam weight using a difference vector based on two-dimensional difference channel information according to an embodiment of the present invention.

FIG. 3 illustrates a schematic configuration of an apparatus for generating a beam weight using two-dimensional difference channel information in a receiver of a wireless communication system to which a transmission beamforming scheme is applied according to an embodiment of the present invention.

The apparatus for generating a beam weight using two-dimensional difference channel information schematically includes a channel information estimator and channel correlation information generator 110, a beam weight storage 130, a beam weight estimator 150, and a difference vector generator and quantizer 170.

The receiver receives a pilot signal transmitted from a transmitter. The channel information estimator and channel correlation information generator 110 estimates channel information from the pilot signal and calculates channel correlation information of time and frequency by [Equation 2] and [Equation 3].

The beam weight estimator 150 obtains information about a beam weight of the previous channel from the beam weight storage 130 and estimates a beam weight of the current channel by [Equation 4] based on the calculated channel correlation information.

The difference vector generator and quantizer 170 finds an optimal index $\hat{i}$ of quantizing a difference vector using a predefined codebook as indicated by [Equation 6] and [Equation 7]. The beam weight storage 130 stores a beam weight $\tilde{w}$(k,t) of the current channel obtained by [Equation 6] and [Equation 7]. The quantized codebook index $\hat{i}$ of the difference vector is fed back to the transmitter.

Figure 4:
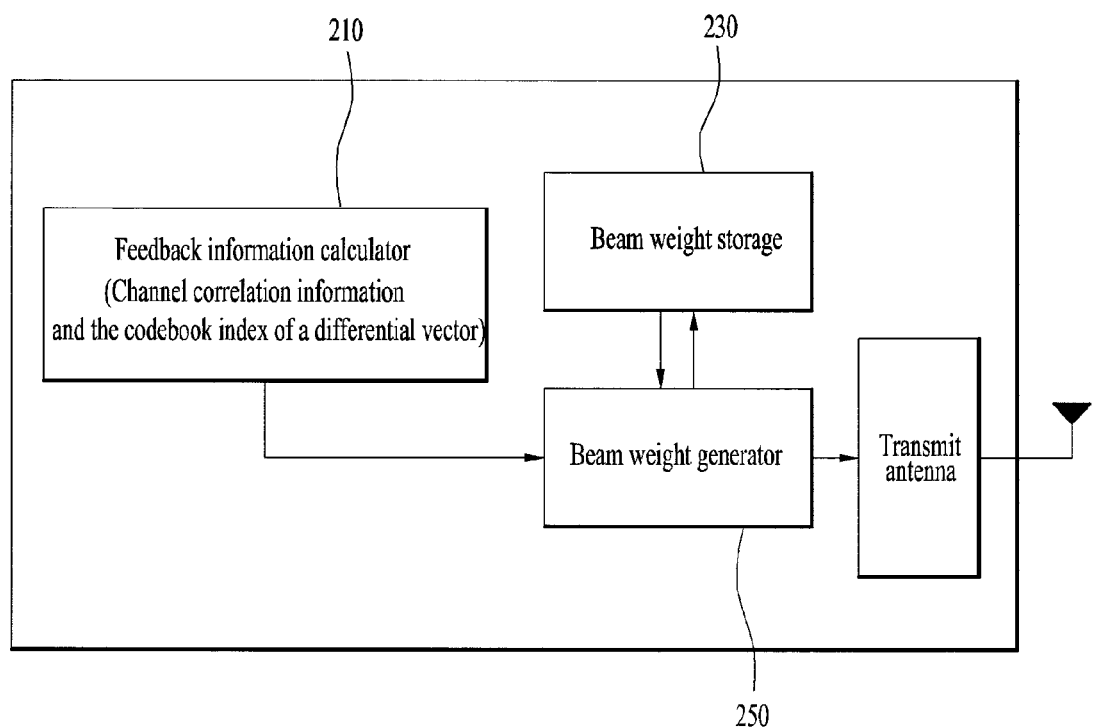
FIG. 4 is a diagram illustrating the configuration of an apparatus for generating a beam weight using feedback channel information according to an embodiment of the present invention.

FIG. 4 illustrates a schematic configuration of an apparatus for generating a beam weight based on two-dimensional difference channel information fed back from a receiver in a transmitter of a wireless communication system to which a transmission beamforming scheme is applied according to an embodiment of the present invention.

The apparatus for generating a beam weight based on two-dimensional difference channel information schematically includes a feedback information extractor 210, a beam weight storage 230, and a beam weight generator 250.

The feedback information extractor 210 extracts channel correlation information which is fed back from the receiver with a long period and a codebook index $\hat{i}$ of a quantized difference vector which is instantaneously fed back. The beam weight storage 230 stores beam weight information of the previous channel and provides the beam weight information of the previous channel to the beam weight generator 250. The beam weight generator 250 generates a beam weight of the current channel by [Equation 8] based on the beam weight information w(k,t−Δt) and w(k−Δk,t) obtained from the beam weight storage 230. The generated beam weight is stored in the beam weight storage 230.

Figure 5:
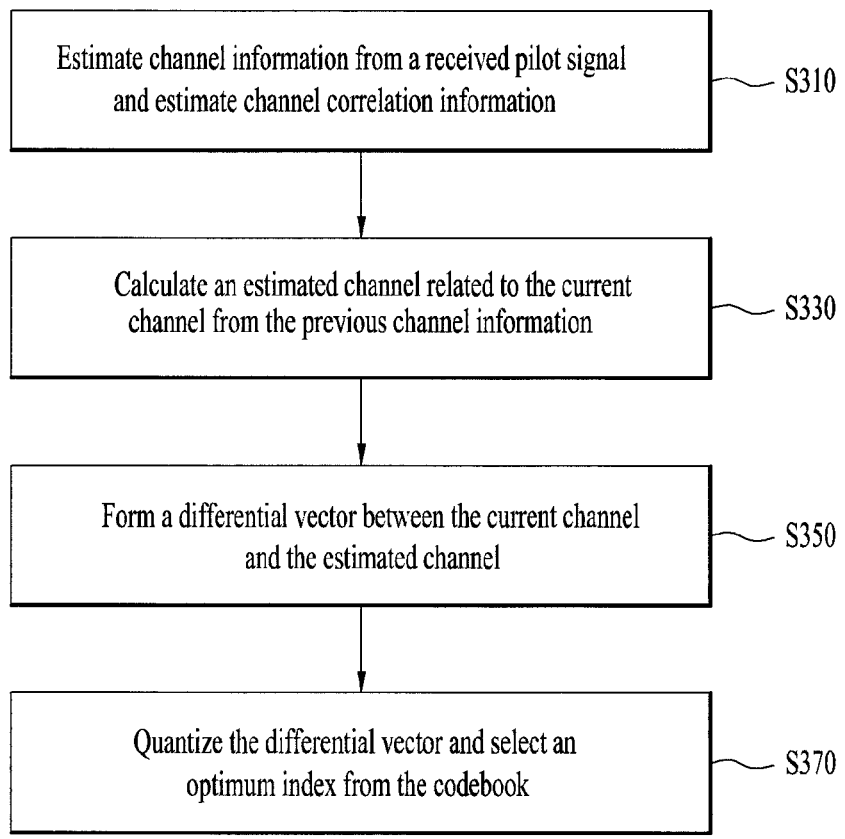
FIG. 5 is a flowchart illustrating a method for generating a quantized channel using instantaneous difference information based on two-dimensional difference channel information according to an embodiment of the present invention.

FIG. 5 is a flowchart illustrating a method for generating a beam weight by tracking the magnitude of an instantaneous difference vector in a receiver of a wireless communication system to which a transmission beamforming scheme is applied according to an embodiment of the present invention.

The receiver estimates channel information from a received pilot signal and derives channel correlation information using the estimated channel information as indicated by [Equation 2] and [Equation 3] (S310).

The receiver derives an estimated channel component related to the current channel from the previous channel information stored in the receiver based on the derived channel correlation information (S330) as indicated by [Equation 9]:

$$\hat{h}(k, t) = \frac{\rho_{\Delta t}(1 - |\rho_{\Delta f}|^2)}{1 - |\rho_{\Delta t}|^2|\rho_{\Delta f}|^2} h(k, t - \Delta t) +$$

$$\frac{\rho_{\Delta f}(1 - |\rho_{\Delta t}|^2)}{1 - |\rho_{\Delta t}|^2|\rho_{\Delta f}|^2} h(k - \Delta k, t)$$

$$\triangleq \alpha h(k, t - \Delta t) + \beta h(k - \Delta k, t),$$

[Equation 9]

where h(k,t−Δt) and h(k−Δk,t) respectively denote the previous channels on the time and frequency axes.

The receiver generates a difference vector between the current channel and the estimated channel $\hat{h}(k,t)$ obtained by [Equation 9] (S350). A detailed process of generating the difference vector is indicated by [Equation 10]:

$$h(k, t) - \hat{h}(k, t) = \sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}} z(k, t)$$

$$\triangleq \gamma \|z(k, t)\| \hat{z}(k, t),$$

[Equation 10]

where each h(k,t) and z(k,t) is a $(N_t \times 1)$-dimensional vector including independent and identically distributed complex Gaussian random variables, an average of which is 0 and a variance of which is 1, and ∥z(k,t)∥ denotes a normalized value of z(k,t).

Through the above process, the receiver quantizes the difference vector and selects an optimal index from a codebook (S370). The quantization index $\hat{i}$ of the difference vector and the magnitude ∥z(k,t)∥ of an instantaneous difference vector are extracted and fed back. In generating the beam weight vector by [Equation 6], the magnitude of the difference vector track not the amount of an instantaneous channel variation but the amount of an average channel variation according to the channel correlation information. To track the instantaneous difference vector, the magnitude ∥z(k,t)∥ of the instantaneous difference vector should be fed back so as to generate a beam weight vector which can track the instantaneous variation amount of a channel in the transmitter. Accordingly, the transmitter generates not a beam weight but a quantized channel using the quantized codebook index of the difference vector and ∥z(k,t)∥. The above process is described in detail with reference to [Equation 11]. A channel model which is generated by quantizing $\hat{z}(k,t)$ from [Equation 9] and [Equation 10] using a B-bit codebook and using ∥z(k,t)∥ is as follows:

$$\tilde{h}(k, t) = \alpha \tilde{h}(k, t - \Delta t) + \beta \tilde{h}(k - \Delta k, t) + \gamma \|z(k, t)\| \hat{z}_i$$

$$\triangleq \alpha \tilde{h}(k, t - \Delta t) + \beta \tilde{h}(k - \Delta k, t) + \eta \hat{z}_i,$$

[Equation 11]

where $\hat{i}$ may be derived by the following [Equation 12]:

$$\hat{i} = \arg\max_{1 \leq i \leq 2^B} \left| h(k, t) \left( \frac{\alpha \tilde{h}(k, t - \Delta t) + \beta \tilde{h}(k - \Delta k, t) + \|z(k, t)\| \hat{z}_i}{\|\alpha \tilde{h}(k, t - \Delta t) + \beta \tilde{h}(k - \Delta k, t) + \|z(k, t)\| \hat{z}_i\|} \right) \right|$$

[Equation 12]

Figure 6:
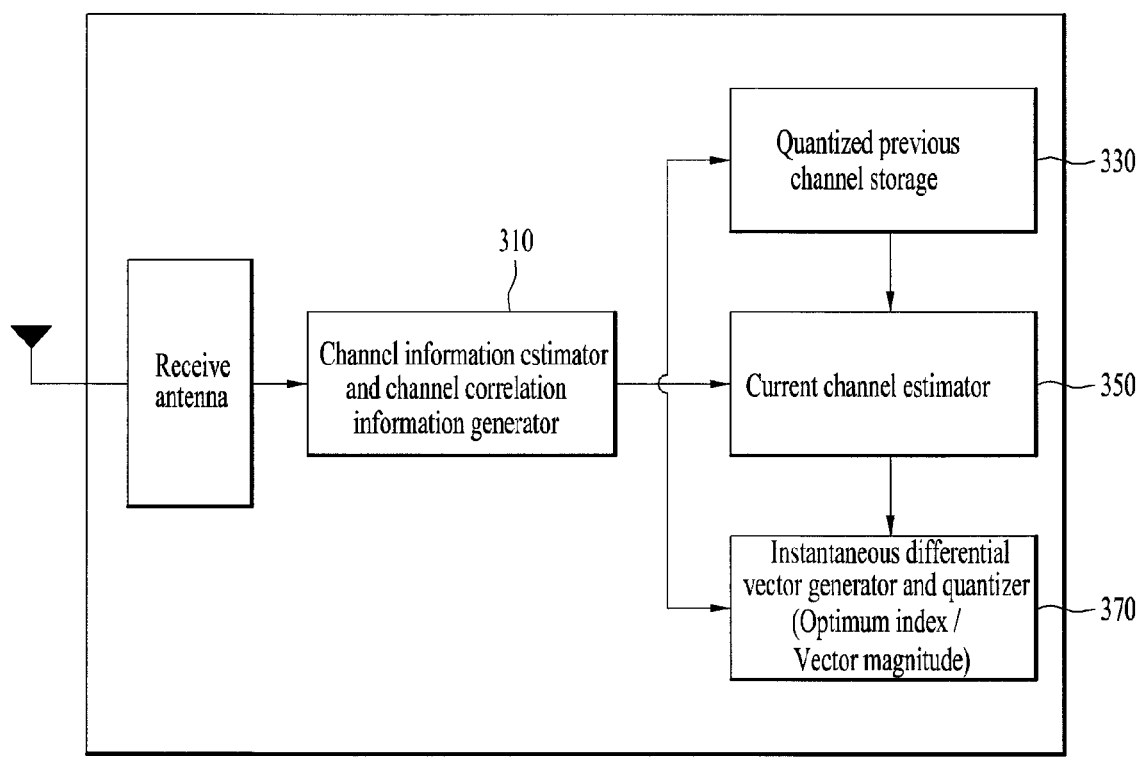
FIG. 6 is a diagram illustrating the configuration of an apparatus for generating a quantized channel using instantaneous difference information based on two-dimensional difference channel information according to an embodiment of the present invention.

FIG. 6 illustrates a schematic configuration of an apparatus for generating a beam weight by tracking the magnitude of an instantaneous difference vector in a receiver of a wireless communication system to which a transmission beamforming scheme is applied according to an embodiment of the present invention.

The apparatus for generating a beam weight by tracking the magnitude of an instantaneous difference vector schematically includes a channel information estimator and channel correlation information generator 310, a quantized previous channel storage 330, a current channel estimator 350, and an instantaneous difference vector generator and quantizer 370.

The receiver receives a pilot signal transmitted from a transmitter. The channel information estimator and channel correlation information generator 310 estimates channel information from the pilot signal and derives channel correlation information of time and frequency through [Equation 2] and [Equation 3].

Using the previous channel information $\tilde{h}(k,t-\Delta t)$ and $\tilde{h}(k-\Delta k,t)$ obtained from the quantized previous channel storage 330 and quantized based on the channel correlation information through the above process, the instantaneous difference vector generator and quantizer 370 finds an optimal index $\hat{i}$ of quantizing a difference vector using a predefined codebook through [Equation 11] and [Equation 12] and determines the magnitude ∥z(k,t)∥ of the instantaneous difference vector. The quantized current channel $\tilde{h}(k,t)$ obtained by [Equation 11] is stored in the quantized previous channel storage 330. The quantized codebook index $\hat{i}$ of the difference vector and the magnitude ∥z(k,t)∥ of the instantaneous difference vector are fed back to the transmitter.

Figure 7:
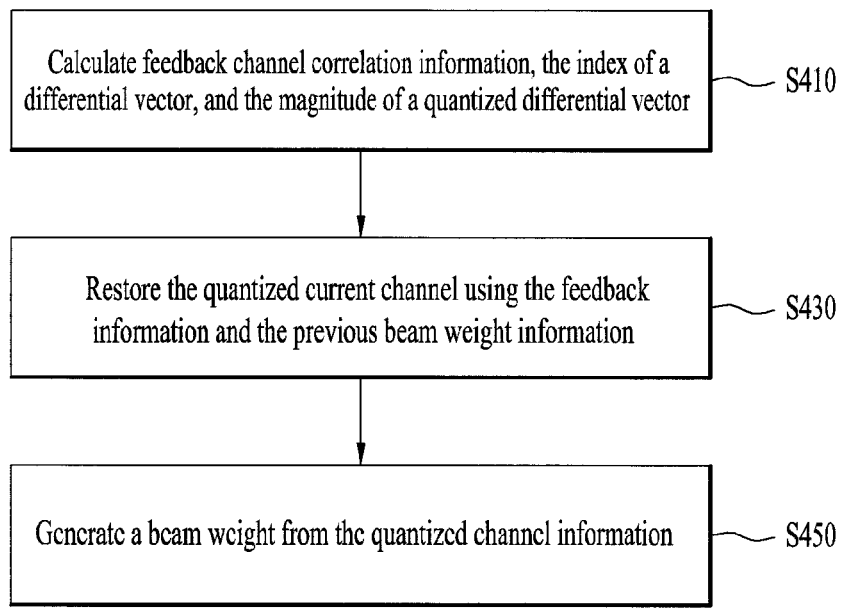
FIG. 7 is a flowchart illustrating a method for generating a beam weight from a quantized channel using feedback channel information according to an embodiment of the present invention.

FIG. 7 is a flowchart illustrating a method for generating a beam weight by tracking the magnitude of an instantaneous difference vector in a transmitter of a wireless communication system to which a transmission beamforming scheme is applied according to an embodiment of the present invention.

The transmitter extracts feedback channel correlation information, the index $\hat{i}$ of a quantized difference vector, and the magnitude $\|z(k,t)\|$ of a quantized instantaneous difference vector (S410).

The transmitter restores the quantized current channel using the previous channel information stored in the transmitter based on the extracted information (S430). The transmitter generates a beam weight of the current channel from the restored channel information (S450).

The process (S430) for restoring the current channel based on the above feedback information will now be described in more detail. A quantized channel $\tilde{h}(k,t)$ is generated by [Equation 13] based on channel correlation information $\rho_{\Delta t}$ and $\rho_{\Delta f}$ which are fed back with a long period, the previous channel information $\tilde{h}(k,t-\Delta t)$ and $\tilde{h}(k-\Delta k,t)$ stored in the transmitter, a codebook index $\hat{i}$ of a difference vector which is instantaneously fed back, and the magnitude $\|z(k,t)\|$ of a quantized instantaneous difference vector:

$$\tilde{h}(k,t) = \alpha \tilde{h}(k,t-\Delta t) + \beta \tilde{h}(k-\Delta k,t) + \gamma \|z(k,t)\| \hat{z}_{\hat{i}} \quad \text{[Equation 13]}$$

Figure 8:
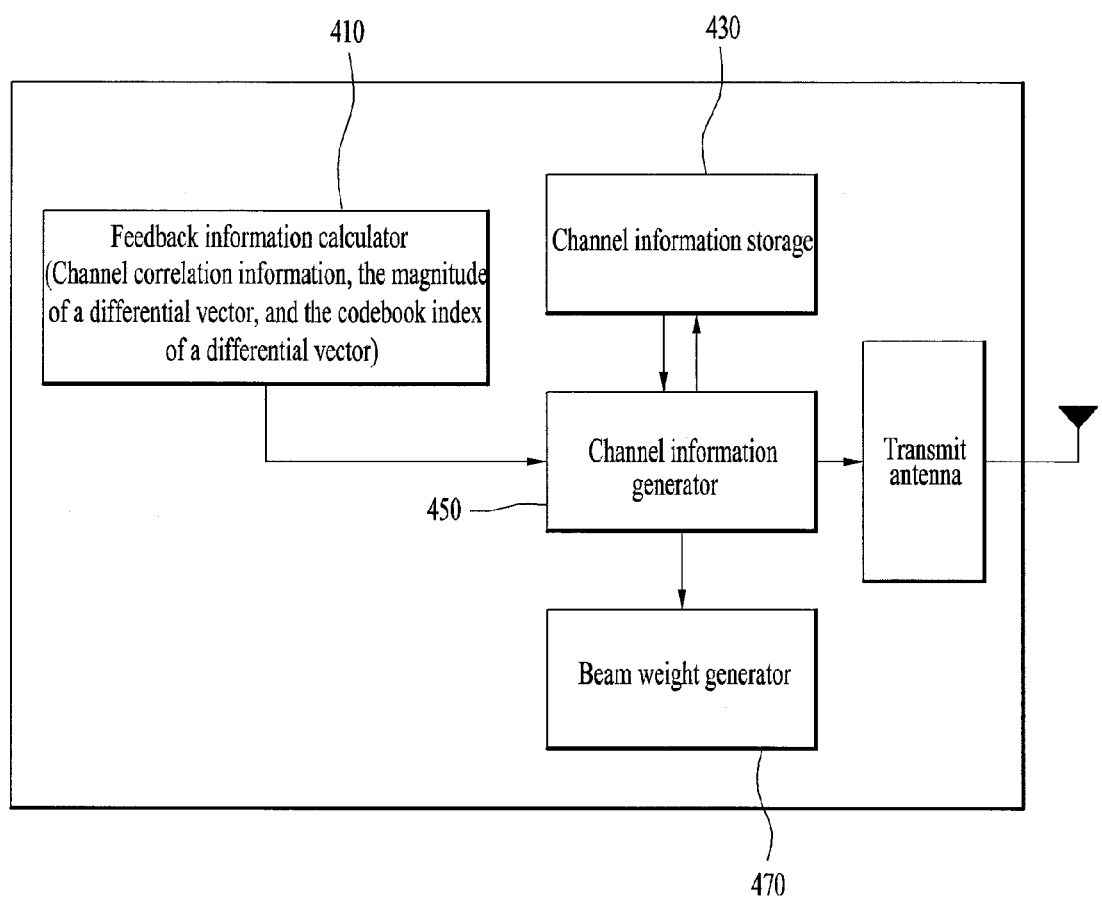
FIG. 8 is a diagram illustrating the configuration of an apparatus for generating a beam weight from a quantized channel using feedback channel information according to an embodiment of the present invention.

FIG. 8 illustrates a schematic configuration of an apparatus for generating a beam weight by tracking the magnitude of an instantaneous difference vector in a transmitter of a wireless communication system to which a transmission beamforming scheme is applied according to an embodiment of the present invention.

The apparatus for generating a beam weight through the above two-dimensional difference feedback schematically includes a channel information extractor 410, a channel information storage 430, a channel information generator 450, and a beam weight generator 470.

The feedback information extractor 410 extracts channel correlation information which is fed back from the receiver with a long period, and a quantized index of a difference vector which are instantaneously fed back and the magnitude of a quantized instantaneous difference vector. The channel information storage 430 stores the previous channel information and provides the previous channel information to the channel information generator 450. The channel information generator 450 restores channel information about the current channel through [Equation 13] based on the information obtained through the above process. The channel information storage 430 stores the restored channel information. The beam weight generator 470 generates a beam weight optimized for the current channel through the following [Equation 14] from the restored channel information:

$$w(k,t) = \frac{\tilde{h}^*(k,t)}{\|\tilde{h}(k,t)\|}, \quad \text{[Equation 14]}$$

where $\tilde{h}(k,t)$ denotes a quantized channel component and $w(k,t)$ denotes a transmission beam weight.

According to the embodiments of the present invention described above, in order to reduce a channel quantization error and feedback information overhead in an OFDM based multi-antenna wireless communication system using a transmission beamforming scheme, a method and apparatus are provided in which a receiver estimates the current channel information using two-dimensional channel correlation information of time and frequency based on the previous channel information and feeds back only difference channel information, corresponding to the difference between the estimated channel information and actual channel information, to a transmitter, thereby reducing the amount of feedback information or the quantization error of codebook.

In addition, a method and apparatus are proposed which are capable of decreasing a channel quantization error and simultaneously decreasing feedback information overhead by causing a receiver to feed back the instantaneous magnitude of a difference vector during feedback of difference information so that a transmitter can obtain more accurate channel information and generate a beam weight having a low quantization error, thereby improving beamforming performance in an OFDM based multi-antenna environment.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalent scope of the invention are intended to be within the scope of the invention.

The invention claimed is:

1. A method for transmission beamforming in an Orthogonal Frequency Division Multiplexing (OFDM) based wireless system employing multiple antennas, the method comprising:
   receiving a pilot signal from a transmitter and calculating channel correlation information in a time and frequency domain using the pilot signal;
   estimating a current beam weight using previous beam weights and the channel correlation information;
   calculating a difference vector between an actual current beam weight and the estimated beam weight and quantizing the difference vector;
   selecting an optimum index from a predefined codebook for the quantized difference vector; and
   generating a quantized transmission beam weight using the optimum index, wherein the quantized transmission beam weight is calculated by [Equation 6]:

$$\tilde{w}(k,t) = \frac{\alpha \tilde{w}(k,t-\Delta t) + \beta \tilde{w}(k-\Delta k,t) + \gamma \hat{z}_{\hat{i}}}{\|\alpha \tilde{w}(k,t-\Delta t) + \beta \tilde{w}(k-\Delta k,t) + \gamma \hat{z}_{\hat{i}}\|}, \quad \text{[Equation 6]}$$

where $\tilde{w}(k,t-\Delta t)$ and $\tilde{w}(k-\Delta k,t)$ respectively denote previous quantized beam weights in the time and frequency domain, $\tilde{w}(k,t)$ denotes the quantized transmission beam weight, $\alpha$ and $\beta$ are coefficients related with the channel correlation information, $\hat{z}_i$ denotes a normalized vector of the quantized difference vector, $\gamma$ denotes a magnitude of the difference vector, $\hat{i}$ denotes the optimum index, and $\|\cdot\|$ denotes a vector norm operator.

2. The method of claim 1, wherein the estimated beam weight is calculated by [Equation 4]:

$$\hat{w}(k,t) = \frac{\rho_{\Delta t}(1-|\rho_{\Delta f}|^2)}{1-|\rho_{\Delta t}|^2|\rho_{\Delta f}|^2} \frac{\|h^*(k,t-\Delta t)\|}{\|h^*(k,t)\|} \frac{h^*(k,t-\Delta t)}{\|h^*(k,t-\Delta t)\|} + \frac{\rho_{\Delta f}(1-|\rho_{\Delta t}|^2)}{1-|\rho_{\Delta t}|^2|\rho_{\Delta f}|^2} \frac{\|h^*(k-\Delta k,t)\|}{\|h(k,t)\|} \frac{h^*(k-\Delta k,t)}{\|h^*(k-\Delta k,t)\|} \quad \text{[Equation 4]}$$

-continued $$\overset{\Delta}{=} \alpha \frac{\|h^*(k, t-\Delta t)\|}{\|h^*(k, t)\|} w(k, t-\Delta t) + \beta \frac{\|h^*(k-\Delta k, t)\|}{\|h^*(k, t)\|}$$

$$w(k-\Delta k, t)$$

$$\simeq \alpha w(k, t-\Delta t) + \beta w(k-\Delta k, t),$$

where $\tilde{w}(k,t)$ denotes the estimated beam weight, $$\alpha = \frac{\rho_{\Delta t}(1-|\rho_{\Delta f}|^2)}{1-|\rho_{\Delta t}|^2|\rho_{\Delta f}|^2} \text{ and } \beta = \frac{\rho_{\Delta f}(1-|\rho_{\Delta t}|^2)}{1-|\rho_{\Delta t}|^2|\rho_{\Delta f}|^2},$$

h(k,t) denotes a (1×$N_r$)-dimensional current channel vector whose elements are independent and identically distributed zero-mean complex Gaussian random variables with unit variance, h(k,t−Δt) and h(k−Δk,t) and respectively denote previous channel information in the time and frequency domain, w(k,t−Δt) and w(k−Δk,t) respectively denote previous beam weights in the time and frequency domain, $$w(k, t-\Delta t) = \frac{h^*(k, t-\Delta t)}{\|h^*(k, t-\Delta t)\|} \text{ and } w(k-\Delta k, t) = \frac{h^*(k-\Delta k, t)}{\|h^*(k-\Delta k, t)\|},$$

norm of each of which is 1, and satisfying a relationship of $$\frac{\|h^*(k, t-\Delta t)\|}{\|h^*(k, t)\|} \approx \frac{\|h^*(k-\Delta k, t)\|}{\|h^*(k, t)\|} \approx 1$$

in correlated channel environments, * denotes a complex conjugate operator, and $\rho_{\Delta t}$ and $\rho_{\Delta f}$ respectively denote the channel correlation information in the time and frequency domain.

3. The method of claim 1, $$\hat{w}(k, t) = \frac{\rho_{\Delta t}(1-|\rho_{\Delta f}|^2)\|h^*(k, t-\Delta t)\|}{1-|\rho_{\Delta t}|^2|\rho_{\Delta f}|^2\|h^*(k, t)\|} \frac{h^*(k, t-\Delta t)}{\|h^*(k, t-\Delta t)\|} +$$

$$\frac{\rho_{\Delta f}(1-|\rho_{\Delta t}|^2)}{1-|\rho_{\Delta t}|^2|\rho_{\Delta f}|^2} \frac{\|h^*(k-\Delta k, t)\|}{\|h(k, t)\|} \frac{h^*(k-\Delta k, t)}{\|h^*(k-\Delta k, t)\|} \overset{\Delta}{=}$$

$$\alpha \frac{\|h^*(k, t-\Delta t)\|}{\|h^*(k, t)\|} w(k, t-\Delta t) + \beta \frac{\|h^*(k-\Delta k, t)\|}{\|h^*(k, t)\|} w(k-\Delta k, t) =$$

$$\alpha w(k, t-\Delta t) + \beta w(k-\Delta k, t)$$

wherein the difference vector is calculated by [Equation 5]:

$$w(k, t) - \hat{w}(k, t) = \sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}} \hat{z}(k, t) \quad \text{[Equation 5]}$$

$$\overset{\Delta}{=} \gamma \hat{z}(k, t),$$

where $$\gamma = \sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}}$$

w(k,t) denotes the actual current beam weight, $\hat{w}$(k,t) denotes the estimated beam weight, $\rho_{\Delta t}$ and $\rho_{\Delta f}$ respectively denote the channel correlation information in the time and frequency domain, and $\hat{z}$(k,t) denotes a normalized vector of the difference vector.

4. The method of claim 1, wherein the optimum index is selected by [Equation 7]:

[Equation 7]

$$\hat{i} = \arg\max_{1 \leq i \leq 2^B} |h(k, t)\tilde{w}(k, t)|,$$

where h(k,t) denotes a (1×$N_r$)-dimensional current channel vector, and B denotes a size of the predefined codebook.

5. The method of claim 1, further comprising transmitting the optimum index to the transmitter.

6. An apparatus for generating a transmission beam in an Orthogonal Frequency Division Multiplexing (OFDM) based wireless system using multiple antennas, the apparatus comprising:
an antenna; and
a processing unit operatively connected to the antenna, wherein the processing unit is configured to:
receive a pilot signal from a transmitter through the antenna and calculate channel correlation information in a time and frequency domain using the pilot signal,
estimate a current beam weight using previous beam weights and the channel correlation information,
calculate a difference vector between an actual current beam weight and the estimated beam weight and quantize the difference vector,
select an optimum index from a predefined codebook for the quantized difference vector, and
generate a quantized transmission beam weight using the optimum index, wherein the quantized transmission beam weight is calculated according to [Equation 6]:

$$\tilde{w}(k, t) = \frac{\alpha \tilde{w}(k, t-\Delta t) + \beta \tilde{w}(k-\Delta k, t) + \gamma \hat{z}_{\hat{i}}}{\|\alpha \tilde{w}(k, t-\Delta t) + \beta \tilde{w}(k-\Delta k, t) + \gamma \hat{z}_{\hat{i}}\|}, \quad \text{[Equation 6]}$$

where $\tilde{w}$(k,t−Δt) and $\tilde{w}$(k−Δk,t) respectively denote previous quantized beam weights in the time and frequency domain, $\tilde{w}$(k,t) denotes the quantized transmission beam weight, α and β are coefficients related with the channel correlation information, $\hat{z}_i$ denotes a normalized vector of the quantized difference vector, γ denotes a magnitude of the difference vector, and $\hat{i}$ denotes the optimum index, and $\|\cdot\|$ denotes a vector norm operator.

7. The apparatus of claim 6, wherein the estimated beam weight is calculated by [Equation 4]:

$$\tilde{w}(k, t) = \frac{\rho_{\Delta t}(1-|\rho_{\Delta f}|^2)}{|\rho_{\Delta t}|^2|\rho_{\Delta f}|^2} \frac{\|h^*(k, t-\Delta t)\|}{\|h^*(k, t)\|} \frac{h^*(k, t-\Delta t)}{\|h^*(k, t-\Delta t)\|} + \quad \text{[Equation 4]}$$

$$\frac{\rho_{\Delta f}(1-|\rho_{\Delta t}|^2)}{1-|\rho_{\Delta t}|^2|\rho_{\Delta f}|^2} \frac{\|h^*(k-\Delta k, t)\|}{\|h(k, t)\|} \frac{h^*(k-\Delta k, t)}{\|h^*(k-\Delta k, t)\|}$$

$$\overset{\Delta}{=} \alpha \frac{h^*(k, t-\Delta t)}{\|h^*(k, t)\|} w(k, t-\Delta t) +$$

-continued $$\beta \frac{h^*(k - \Delta k, t)}{\|h^*(k, t)\|} w(k - \Delta k, t)$$

$$\simeq \alpha w(k, t - \Delta t) + \beta w(k - \Delta k, t),$$

where $\hat{w}(k,t)$ denotes the estimated beam weight, $$\alpha = \frac{\rho_{\Delta t}(1 - |\rho_{\Delta f}|^2)}{1 - |\rho_{\Delta t}|^2 |\rho_{\Delta f}|^2}, \beta = \frac{\rho_{\Delta f}(1 - |\rho_{\Delta t}|^2)}{1 - |\rho_{\Delta t}|^2 |\rho_{\Delta f}|^2},$$

$h(k,t)$ denotes a $(1 \times N_t)$-dimensional current channel vector whose elements are independent and identically distributed zero-mean complex Gaussian random variables with unit variance, $h(k, t-\Delta t)$ and $h(k-\Delta k, t)$ and respectively denote previous channel information in the time and frequency domain, $w(k, t-\Delta t)$ and $w(k-\Delta k, t)$ respectively denote previous beam weights in the time and frequency domain, $$w(k, t - \Delta t) = \frac{h^*(k, t - \Delta t)}{\|h(k, t - \Delta t)\|} \text{ and } w(k - \Delta k, t) = \frac{h^*(k - \Delta k, t)}{\|h(k - \Delta k, t)\|},$$

norm of each of which is 1, and satisfying a relationship of $$\frac{\|h(k, t - \Delta t)\|}{\|h(k, t)\|} \approx \frac{\|h(k - \Delta k, t)\|}{\|h(k, t)\|} \approx 1$$

in correlated channel environments, * denotes a complex conjugate operator, and $\rho_{\Delta t}$ and $\rho_{\Delta f}$ respectively denote the channel correlation information in the time and frequency domain.

8. The apparatus of claim 6, wherein the difference vector is calculated by [Equation 5]:

$$w(k, t) - \hat{w}(k, t) = \qquad [\text{Equation 5}]$$

$$\sqrt{1 - \frac{|\rho_{\Delta t}|^2 + |\rho_{\Delta f}|^2 - 2|\rho_{\Delta t}|^2 |\rho_{\Delta f}|^2}{1 - |\rho_{\Delta t}|^2 |\rho_{\Delta f}|^2}} \, \hat{z}(k, t) \triangleq \gamma \hat{z}(k, t),$$

where $$\gamma = \sqrt{1 - \frac{|\rho_{\Delta t}|^2 + |\rho_{\Delta f}|^2 - 2|\rho_{\Delta t}|^2 |\rho_{\Delta f}|^2}{1 - |\rho_{\Delta t}|^2 |\rho_{\Delta f}|^2}},$$

$w(k,t)$ denotes the actual current beam weight, $\hat{w}(k,t)$ denotes the estimated beam weight, $\rho_{\Delta t}$ and $\rho_{\Delta f}$ respectively denote the channel correlation information in the time and frequency domain, and $\hat{z}(k,t)$ denotes a normalized vector of the difference vector.

9. The apparatus of claim 6, wherein the optimum index is selected by [Equation 7]:

$$\hat{i} = \arg \max_{1 \le i \le 2^B} |h(k, t)\tilde{w}(k, t)|, \qquad [\text{Equation 7}]$$

where $h(k,t)$ denotes a $(1 \times N_t)$-dimensional current channel vector, and B denotes a size of the predefined codebook.

10. The apparatus of claim 6, wherein the processing unit is further configured to transmit the optimum index to the transmitter through the antenna.

11. A method for transmission beamforming in an Orthogonal Frequency Division Multiplexing (OFDM) based wireless system employing multiple antennas, the method comprising:
receiving a pilot signal from a transmitter and calculating channel correlation information in a time and frequency domain using the pilot signal;
estimating current channel information using the channel correlation information;
calculating a difference vector indicating a difference between actual current channel information and the estimated channel information, calculating a magnitude of the difference vector, and quantizing the difference vector; and
selecting an optimum index from a predefined codebook for the quantized difference vector, and reporting the optimum index and the magnitude of the difference vector to the transmitter, wherein the optimum index is selected by [Equation 12]:

$$\hat{i} = \arg \max_{1 \le i \le 2^B} \left| h(k, t) \qquad [\text{Equation 12}] \right.$$

$$\left. \left( \frac{\alpha \tilde{h}(k, t - \Delta t) + \beta \tilde{h}(k - \Delta k, t) + \|z(k, t)\| \hat{z}_i}{\left\| \alpha \tilde{h}(k, t - \Delta t) + \beta \tilde{h}(k - \Delta k, t) + \|z(k, t)\| \hat{z}_i \right\|} \right) \right|,$$

where $\hat{i}$ denotes the optimum index, $h(k,t)$ denotes the actual current channel information, $\tilde{h}(k, t-\Delta t)$ and $\tilde{h}(k-\Delta k, t)$ respectively denote previous quantized channel information in the time and frequency domain, $\alpha$ and $\beta$ are coefficients related with the channel correlation information, $z(k,t)$ denotes the difference vector, $\hat{z}_i$ denotes a normalized vector of the quantized difference vector, B denotes a size of the predefined codebook, and $\|\cdot\|$ denotes a vector norm operator.

12. The method of claim 11, wherein the estimated channel information is calculated by [Equation 9]:

$$\hat{h}(k, t) = \frac{\rho_{\Delta t}(1 - |\rho_{\Delta f}|^2)}{1 - |\rho_{\Delta t}|^2 |\rho_{\Delta f}|^2} h(k, t - \Delta t) + \qquad [\text{Equation 9}]$$

$$\frac{\rho_{\Delta f}(1 - |\rho_{\Delta t}|^2)}{1 - |\rho_{\Delta t}|^2 |\rho_{\Delta f}|^2} h(k - \Delta k, t)$$

$$\triangleq \alpha h(k, t - \Delta t) + \beta h(k - \Delta k, t),$$

where $h(k, t-\Delta t)$ and $h(k-\Delta k, t)$ and respectively denote previous channel information in the time and frequency domain, and $\hat{h}(k,t)$ denotes the estimated channel information, $$\alpha = \frac{\rho_{\Delta t}(1 - |\rho_{\Delta f}|^2)}{1 - |\rho_{\Delta t}|^2 |\rho_{\Delta f}|^2}, \beta = \frac{\rho_{\Delta f}(1 - |\rho_{\Delta t}|^2)}{1 - |\rho_{\Delta t}|^2 |\rho_{\Delta f}|^2},$$

and $\rho_{\Delta t}$ and $\rho_{\Delta f}$ respectively denote the channel correlation information in the time and frequency domain.

13. The method of claim 11, wherein the difference vector is calculated by [Equation 10]:

$$h(k, t) - \hat{h}(k, t) = \sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}} \, z(k, t)$$

[Equation 10]

$$\triangleq \gamma \|z(k, t)\| \hat{z}(k, t),$$

where $\hat{h}(k,t)$ denotes the estimated channel information, each of $h(k,t)$ and $z(k,t)$ corresponds to a $(N_t \times 1)$-dimensional vectors whose elements are independent and identically distributed zero-mean complex Gaussian random variables with a same unit variance, $\hat{z}(k,t)$ denotes a normalized vector of the difference vector, $\|z(k,t)\|$ denotes the magnitude of the difference vector, $$\gamma = \sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}} \text{, and}$$

$\rho_{\Delta t}$ and $\rho_{\Delta f}$ respectively denote the channel correlation information in the time and frequency domain.

14. The method of claim 11, wherein the transmitter extracts the channel correlation information, the optimum index, and the magnitude of the quantized difference vector, generates quantized channel information using the channel correlation information, the optimum index, and the magnitude of the quantized difference vector, and generates a transmission beam weight using the quantized channel information.

15. The method of claim 14, wherein the quantized channel information is calculated by [Equation 13]:

$$\tilde{h}(k,t) = \alpha \tilde{h}(k,t-\Delta t) + \beta \tilde{h}(k-\Delta k,t) + \gamma \|z(k,t)\| \hat{z}_i$$

[Equation 13]

where $\tilde{h}(k,t)$ denotes the quantized channel information, $\|z(k,t)\|$ denotes the magnitude of the difference vector, $$\gamma = \sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}},$$

and $\rho_{\Delta t}$ and $\rho_{\Delta f}$ respectively denote the channel correlation information in the time and frequency domain.

16. The method of claim 14, wherein the transmission beam weight is calculated by [Equation 14]:

$$w(k, t) = \frac{\tilde{h}^*(k, t)}{\|\tilde{h}(k, t)\|},$$

[Equation 14]

where $w(k,t)$ denotes the transmission beam weight, and * denotes a complex conjugate operator.

17. An apparatus for generating a transmission beam in an Orthogonal Frequency Division Multiplexing (OFDM) based wireless system using multiple antennas, the apparatus comprising:
an antenna; and
a processing unit operatively connected to the antenna, wherein the processing unit is configured to:
receive a pilot signal from a transmitter through the antenna and calculate channel correlation information in a time and frequency domain using the pilot signal;
estimate current channel information using the channel correlation information;
calculate a difference vector indicating a difference between actual current channel information and the estimated channel information, calculate a magnitude of the difference vector, and quantize the difference vector; and
select an optimum index from a predefined codebook for the quantized difference vector, and report the optimum index and the magnitude of the difference vector to the transmitter through the antenna, wherein the optimum index is selected by [Equation 12]:

$$\hat{i} = \arg\max_{1 \leq i \leq 2^B} \left| h(k, t) \left( \begin{array}{c} \alpha \tilde{h}(k, t-\Delta t) + \\ \beta \tilde{h}(k-\Delta k, t) + \|z(k,t)\| \hat{z}_i \\ \hline \|\alpha \tilde{h}(k, t-\Delta t) + \\ \beta \tilde{h}(k-\Delta k, t) + \|z(k,t)\| \hat{z}_i \| \end{array} \right) \right|,$$

[Equation 12]

where $\hat{i}$ denotes the optimum index, $h(k,t)$ denotes the actual current channel information, $\tilde{h}(k,t-\Delta t)$ and $\tilde{h}(k-\Delta k,t)$ respectively denote previous quantized channel information in the time and frequency domain, $\alpha$ and $\beta$ are coefficients related with the channel correlation information, $z(k,t)$ denotes the difference vector, $\hat{z}_i$ denotes a normalized vector of the quantized difference vector, B denotes a size of the predefined codebook, and $\|\cdot\|$ denotes a vector norm operator.

18. The apparatus of claim 17, wherein the estimated channel information is calculated by [Equation 9]:

$$\hat{h}(k, t) =$$

[Equation 9]

$$\frac{\rho_{\Delta t}(1-|\rho_{\Delta f}|^2)}{1-|\rho_{\Delta t}|^2|\rho_{\Delta f}|^2} h(k, t-\Delta t) + \frac{\rho_{\Delta f}(1-|\rho_{\Delta t}|^2)}{1-|\rho_{\Delta t}|^2|\rho_{\Delta f}|^2} h(k-\Delta k, t) \triangleq$$

$$\alpha h(k, t - \Delta t) + \beta h(k - \Delta k, t),$$

where $h(k,t-\Delta t)$ and $h(k-\Delta k,t)$ respectively denote previous channel information in the time and frequency domain, and $\hat{h}(k,t)$ denotes the estimated channel information, $$\alpha = \frac{\rho_{\Delta t}(1-|\rho_{\Delta f}|^2)}{1-|\rho_{\Delta t}|^2|\rho_{\Delta f}|^2} \text{ and } \beta = \frac{\rho_{\Delta f}(1-|\rho_{\Delta t}|^2)}{1-|\rho_{\Delta t}|^2|\rho_{\Delta f}|^2},$$

$\rho_{\Delta t}$ and $\rho_{\Delta f}$ respectively denote the channel correlation information in the time and frequency domain.

19. The apparatus of claim 17, wherein the difference vector is calculated by [Equation 10]:

$$h(k, t) - \hat{h}(k, t) =$$

[Equation 10]

$$\sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}} \, z(k, t) \triangleq$$

$$\gamma \|z(k, t)\| \hat{z}(k, t),$$

where $\hat{h}(k,t)$ denotes the estimated channel information, each of $h(k,t)$ and $z(k,t)$ corresponds to a $(N_t \times 1)$-dimensional vectors whose elements are independent and identically distributed zero-mean complex Gaussian random variables with a same unit variance, $\hat{z}(k,t)$ denotes a normalized vector of the difference vector, $\|z(k,t)\|$ denotes the magnitude of the difference vector, $$\gamma = \sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}},$$

$\rho_{\Delta t}$ and $\rho_{\Delta f}$ respectively denote the channel correlation information in the time and frequency domain.

20. The apparatus of claim 17, wherein the transmitter extracts the channel correlation information, the optimum index, and the magnitude of the quantized difference vector, generates quantized channel information using the channel correlation information, the optimum index, and the magnitude of the quantized difference vector, and generates a transmission beam weight using the quantized channel information.

21. The apparatus of claim 20, wherein the quantized channel information is calculated by [Equation 13]:

$$\tilde{h}(k,t) = \alpha \tilde{h}(k,t-\Delta t) + \beta \tilde{h}(k-\Delta k,t) + \gamma \|z(k,t)\|\hat{z}_j, \quad \text{[Equation 13]}$$

where $\tilde{h}(k,t)$ denotes the quantized channel information, $\|z(k,t)\|$ denotes the magnitude of the difference vector $$\gamma = \sqrt{1 - \frac{|\rho_{\Delta t}|^2 + |\rho_{\Delta f}|^2 - 2|\rho_{\Delta t}|^2|\rho_{\Delta f}|^2}{1 - |\rho_{\Delta t}|^2|\rho_{\Delta f}|^2}},$$

$\rho_{\Delta t}$ and $\rho_{\Delta f}$ respectively denote the channel correlation information in the time and frequency domain.

22. The apparatus of claim 20, wherein the transmission beam weight is calculated by [Equation 14]:

[Equation 14]

$$w(k,t) = \frac{\tilde{h}^*(k,t)}{\|\tilde{h}(k,t)\|},$$

where $w(k,t)$ denotes the transmission beam weight, and * denotes a complex conjugate operator.

* * * * *